Jan. 25, 1949.  A. E. HUMBOLDT  2,460,010
FLEXIBLE TOOL FOR THE APPLICATION
OF EMERGENCY TIRE CHAINS
Filed Feb. 14, 1947
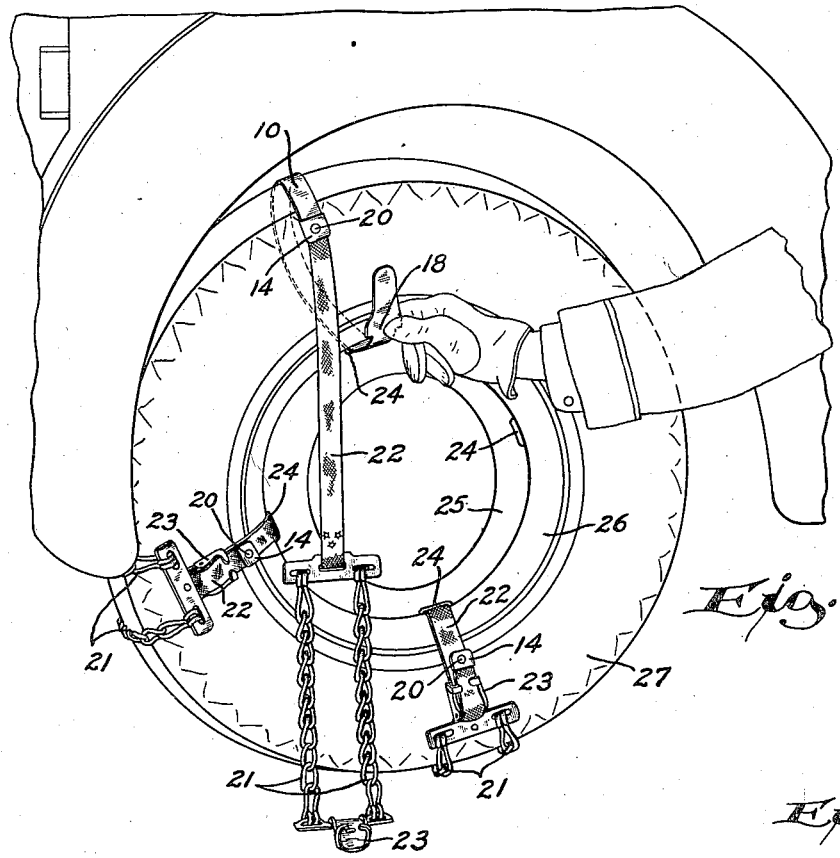
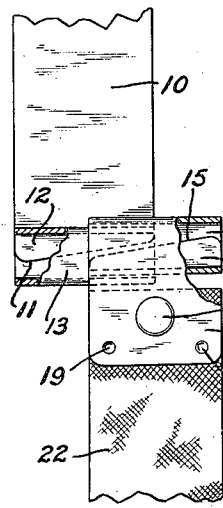
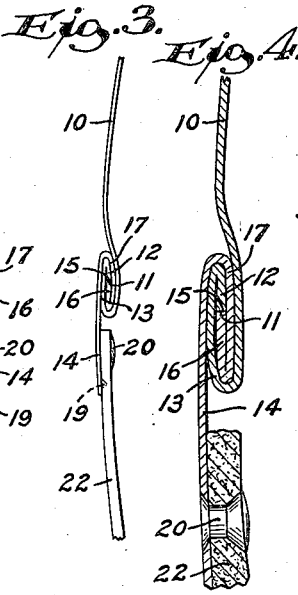
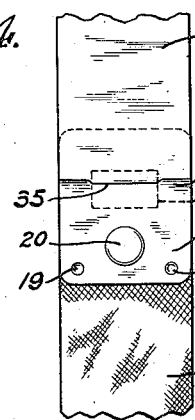
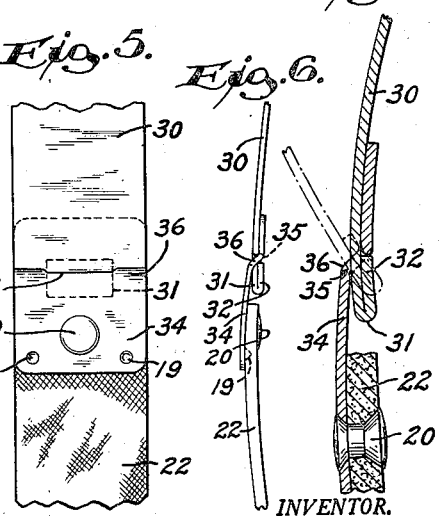
INVENTOR.
A. E. Humboldt
BY
Lieber & Lieber
ATTORNEYS.

the plate 34 as shown in full lines in the drawing, thereby causing the abutments formed by the fold 32 and by the bend 36 to cooperate with the slot 35 to retain the band 30 and plate 34 in assembled condition and longitudinally alined. With the band 30 thus secured to the strap 22, the band 30 may be reversely withdrawn through the slot 24 as hereinabove described, thereby guiding and advancing the chain strap 22 about the tire 27 and through the slot 24 until the chain sections 21 extend transversely across the tire tread. Thereafter, the hooked or abutting ends of the band 30 and plate 34 may be disengaged in an obvious manner by reversely rotating the same relative to each other to the position indicated by dot-and-dash lines and longitudinally withdrawing the band 30 from the slot 35; and the strap 22 may finally be buckled in the usual manner to effect attachment of the chains to the wheel and tire.

From the foregoing detailed description, it is apparent that my present invention provides an improved portable emergency tire chain applying device which is simple, compact and durable in construction, and which is moreover highly efficient and practical in use. The improved devices may be readily produced in large quantities of spring steel or the like by stamping, and the end attaching plates 14 or 34 may be quickly and easily easily secured to the usual chain straps 22 by rivets 20 or the like, and these end plates do not interfere with the buckling operation. The improved fastening means for the band 10 or 30 and strap 22 is extremely simple and results in automatic longitudinal alinement of the resilient band and chain strap, and the devices may be utilized with modern as well as older automobiles without interference wherever a sufficient rim opening is provided to receive the usual strap 22. With the improved chain applicator, it is unnecessary for the operator to jack up the automobile or to reach under the fender or mud-guard to apply emergency chains, and consequently much physical effort as well as wear and tear on hands and clothes is obviated. Tire chain applicators manufactured in accordance with the present invention have proven highly successful in actual use, and can be produced at low cost.

It should be understood that it is not desired to limit this invention to the exact details of construction or to the precise mode of use herein shown and described, for various modifications within the scope of the appended claim may occur to persons skilled in the art to which this invention pertains.

I claim:

A tool for facilitating the application of emergency tire chains having end straps provided with engagement means complementary to that on the tool, said tool comprising, an elongated relatively flexible and normally circular band having one end thereof cut diagonally and bent twice upon itself to form an end hook having a transverse wedge disposed therein.

ARTHUR E. HUMBOLDT.

REFERENCES CITED

The following references are of record in the file of this patent:

UNITED STATES PATENTS

| Number | Name | Date |
| --- | --- | --- |
| 158,243 | Cain | Dec. 29, 1874 |
| 2,034,636 | Sides | Mar. 17, 1936 |
| 2,238,325 | Hudson | Apr. 15, 1941 |
| 2,328,680 | Royer | Sept. 7, 1943 |

FOREIGN PATENTS

| Number | Country | Date |
| --- | --- | --- |
| 304 | Great Britain | Feb. 17, 1858 |
| 281,754 | Great Britain | Dec. 5, 1927 |

Patented Jan. 25, 1949

2,460,010

UNITED STATES PATENT OFFICE 2,460,010

FLEXIBLE TOOL FOR THE APPLICATION OF EMERGENCY TIRE CHAINS

Arthur E. Humboldt, Milwaukee, Wis.

Application February 14, 1947, Serial No. 728,692

1 Claim. (Cl. 81—15.8)

My present invention relates generally to improvements in the art of applying anti-skid devices or chains to automobile wheels, and relates more particularly to improvements in the construction and operation of a tool for facilitating the application of emergency tire chains.

A primary object of the invention is to provide an improved tire chain applicator which is simple and durable in construction and which is moreover highly efficient and practical in operation.

One type of automobile tire chain or anti-skid device in general use is the so-called emergency chain which consists of one or more lengths of chain or the like having a flat fabric strap secured to one end thereof and cooperable with a buckle carried by the other end of the chain to permit encirclement and attachment thereof to the tire and rim of the automobile wheel with the chain portion extending transversely across the tire tread. This type of emergency cross-chain is installed by first passing the relatively flexible fabric strap horizontally or inwardly across the other periphery of the tire, then vertically along the inner side wall of the tire, and thereafter through the opening provided in the wheel or between spokes thereof so as to permit the free end of the strap to be buckled in an obvious manner with the chain retained in position on the tire and extending transversely of the tread thereof.

Since the fenders of the modern automobiles are designed to give a streamlined effect and consequently terminate close to the tire periphery, it is extremely difficult to apply emergency tire chains in the manner hereinabove described without soiling both hands and clothes during the operation; and many devices have consequently been heretofore proposed for aiding in applying such chains. The most common and practical prior chain applying devices consist generally of relatively narrow and flexible substantially circular or semi-circular bodies adapted to be secured in diverse manner to the end of the chain strap so as to serve as a guide during passage of the strap about the tire and through the wheel spokes or openings, the guiding device being detachable upon completion of the operation to enable buckling of the strap in the usual manner. While some of these prior devices have proven somewhat successful, the more recent automobiles are provided with disk wheels having narrow spaced-apart slots adjacent the tire rim, and these slots are of such size as to barely receive the chain strap. Consequently, the means heretofore proposed for attaching the flexible circular guiding devices to the chain strap have proven too bulky, particularly in thickness, to permit passage through the disk slots, and these devices are therefore inoperable with recent model automobiles. Furthermore, many of the fastening means heretofore employed with the chain applying devices have been quite complicated, flimsy and difficult to apply and utilize under all conditions and/or to manufacture and sell at moderate cost.

It is therefore a more specific object of the present invention to provide an improved tire chain applying device which obviates the disadvantages attendant prior art devices, and which may be readily and effectively universally utilized.

Another specific object of this invention is to provide an improved tire chain applicator which may be quickly and easily detachably secured in a simple manner to the free end of the fabric strap of an ordinary emergency tire chain.

Another specific object of my invention is to provide an emergency chain applying device with an improved means for detachably securing the same to the usual chain strap in a highly efficient manner and wherein there is no interference during passage of the device through the slot or other opening in the automobile wheel.

Still another specific object of the invention is to provide an improved tire chain applicator comprising an elongated relatively flexible and normally circular band having an end portion bent upon itself to form an end abutment cooperable with means carried by the free end of the tire chain strap to secure the band to the strap in longitudinal alinement therewith.

An additional specific object of the present invention is to provide an improved tire chain applying device which consists of a minimum number of simple parts which may be readily manufactured in large quantities and at low cost of available materials for convenient and quick application to standard emergency chains without special equipment.

A further specific object of my present invention is to provide an improved portable emergency chain applicator which is compact and light weight, and which may be quickly and easily attached to or detached from the fabric chain strap under diverse conditions by a novice.

These and other specific objects and advantages of my improvement will be apparent from the following detailed description.